United States Patent [19]
Maletsky

[11] Patent Number: 5,945,920
[45] Date of Patent: Aug. 31, 1999

[54] MINIMUM VOLTAGE RADIO FREQUENCY INDENTIFICATION

[75] Inventor: Kerry D. Maletsky, Monument, Colo.

[73] Assignee: Atmel Corporation, San Jose, Calif.

[21] Appl. No.: 08/988,504

[22] Filed: Dec. 10, 1997

[51] Int. Cl.[6] ....................................... H02H 9/00
[52] U.S. Cl. ................... 340/825.54; 340/825.34; 340/825.63; 340/572.1; 340/572.2; 340/572.5; 361/56
[58] Field of Search ........................ 340/825.54, 825.34, 340/825.63, 572, 572.1, 572.2, 572.5; 361/56

[56] References Cited

U.S. PATENT DOCUMENTS

| | | | |
|---|---|---|---|
| 4,333,072 | 6/1982 | Beigel | 340/825.54 |
| 4,918,416 | 4/1990 | Walton et al. | 340/825.63 |
| 5,214,409 | 5/1993 | Beigel | 340/825.54 |
| 5,280,435 | 1/1994 | Weisshaupt et al. | 340/825.54 |
| 5,815,355 | 9/1998 | Dawes | 361/56 |

*Primary Examiner*—Brian Zimmerman
*Assistant Examiner*—Yves Dalencourt
*Attorney, Agent, or Firm*—Thomas Schneck

[57] ABSTRACT

A radio frequency identification device (RFID) which permits various read and write operations at various voltage levels. Certain read operations are permitted as soon as the voltage level in the RFID is sufficient for the circuitry to switch. Errors during such operations are accounted for by retry attempts. Security related operations require higher voltage levels which ensure higher reliability in such operations.

20 Claims, 2 Drawing Sheets

5,945,920

MINIMUM VOLTAGE RADIO FREQUENCY INDENTIFICATION

TECHNICAL FIELD OF THE INVENTION

The present invention generally relates to radio frequency identification ("RFID") devices, and more particularly to RFID access over an extended range.

BACKGROUND ART

Remote electronic identification devices typically consist of remotely disposed transponders and an interrogator unit. The operating range of such devices depends on the underlying architecture of the transponder unit. In U.S. Pat. No. 4,333,072 to Beigel, for example, a remote identification system consists of a probe circuit (interrogator) operating in close proximity to an implant circuit (transponder). The implant circuit is powered when the probe circuit is brought close to the implant, producing a voltage by induction across a coil in the implant. Information from the implant is transferred to the probe by varying the inductive load on the implant's coil and detecting such variations in the probe. This mode of operation requires that the probe be very closely spaced from the implant, thus greatly limiting the range of operation of such devices.

Other remote identification systems use radio frequency signaling to provide the communication link between interrogator and transponder. In one class of these radio frequency identification (RFID) devices, the RF signal includes a power signal that is transmitted to the transponder device. This power signal charges up a power supply capacitor in the transponder, which serves as the power source for the transponder. The transmission of data from the transponder involves the generation and transmission of radio frequency energy. The power supply capacitor must be of sufficient size to provide adequate power for such transmissions. Such transponders allow reading distances on the order of 2 meters. This type of transponder, however, is not practical in applications requiring small size; e.g. livestock identification by subcutaneous implantation of the device.

In a third category of RFIDs, an alternative approach combines features from the above two designs. An interrogator transmits an RF signal which includes a power signal. The voltage induced across the transponder coil by the received power signal is sufficient to operate the transponder circuitry, but not sufficient to generate its own radio signal. A capacitor coupled in parallel with the coil forms a tank circuit, whose Q is varied by varying a resistive or a capacitive load placed across the tank circuit. This changes the tuning of the tank circuit, resulting in variations in the reflected signal which can be detected by the interrogator. Thus, the transponder is able to convey its data to the interrogator simply by modulating the resistive load accordingly and allowing the interrogator to detect variations in the reflected signal.

This scheme has advantages over the above two designs. First, the reflected signal is detectable over a distance of roughly 1 meter. Thus, close proximity operation of the interrogator to the transponder is not required as in the case of the Beigel device. Second, since the transmitted power signal is not being stored in the transponder, there is no need for a bulky power supply capacitor thus permitting a smaller form factor package.

Typically, RFIDs contain writable nonvolatile memories and include a power on reset circuit that prevents operation of the device until the voltage level of the device reaches a certain level. In order to guarantee reliable data transmissions, the practice has been to set the level of the reset circuit to the highest level for operating the nonvolatile memory. This artificially limits the read range, since the reset voltage is much higher than is truly needed to operate the memory.

An improvement would be to increase the operating range of this third category of RFID devices, to provide performance comparable to RFID devices which utilize supply capacitors. What is needed therefore is an RFID device which offers the small package outline that is possible by eliminating a supply capacitor and which features long range read capability.

SUMMARY OF THE INVENTION

The present invention discloses a method of operating a radio frequency identification (RFID) tag and apparatus for such method. The method includes detecting a first voltage level in an RFID tag and transmitting data from the tag in response to such detection. A second voltage level is detected, and in response to such detection certain write operations into memory of the RFID tag are enabled. A third voltage level is detected, at which event write permission to certain secure areas in memory is enabled.

An RFID tag in accordance with the present invention comprises a tank circuit for receiving a power signal transmitted on a radio frequency (RF) carrier by a remote interrogator unit. A bridge circuit in the RFID tag rectifies the power signal and charges a storage capacitor, which supplies sufficient energy ($V_{dd}$) to permit reading of a nonvolatile memory device (e.g. EEPROM, flash) and to operate a modulation circuit in order to modulate a resistive load across the tank circuit. Information is conveyed from the tag to the interrogator by varying the resistive load as a function of the data read from memory. Corresponding variations in the reflected signals are then detected by the interrogator.

A first voltage level-detection circuit provides an enabling signal which allows reading of the memory and operation of the modulator. The first level detector is set so that it enables reading the memory at soon as there is enough voltage for the read circuitry and the modulation circuitry to switch. This increases the operating range of the RFID tag by permitting the transmission of data to occur as soon as possible. Since the logic may operate at a voltage lower than the memory, it is possible that some read operations may result in corrupt data. However, the data will be correct as the voltage continues to rise beyond the minimum operating voltage of the memory device. The data stored in the RFID tag includes error detection codes, so that faulty data which reaches the interrogator can be detected and ignored.

A second voltage level-detection circuit enable write operations into most areas of memory. The voltage level detected by the second level detector is greater than the voltage level detected by the first level detector. Data transmitted by the interrogator to be written includes error detection bits to be written along with the data. Thus, correctness of the data is ensured upon subsequent reading of the data.

The memory includes certain secure portions which contain information such as a password and write lock bits. A third voltage level-detection circuit enables writes to the secure areas of memory. The voltage level detected by the third level detector is greater than the voltage level detected by the second level detector. In a preferred embodiment, the voltage detected by the third level-detector is the same as that of an overvoltage protection circuit. In this way, a write operation into the secure areas of memory is guaranteed to take, since the overvoltage circuit will trip at a voltage level no lower than that needed to effectuate a write to the memory.

BEST MODE OF CARRYING OUT THE INVENTION

Figure 1:
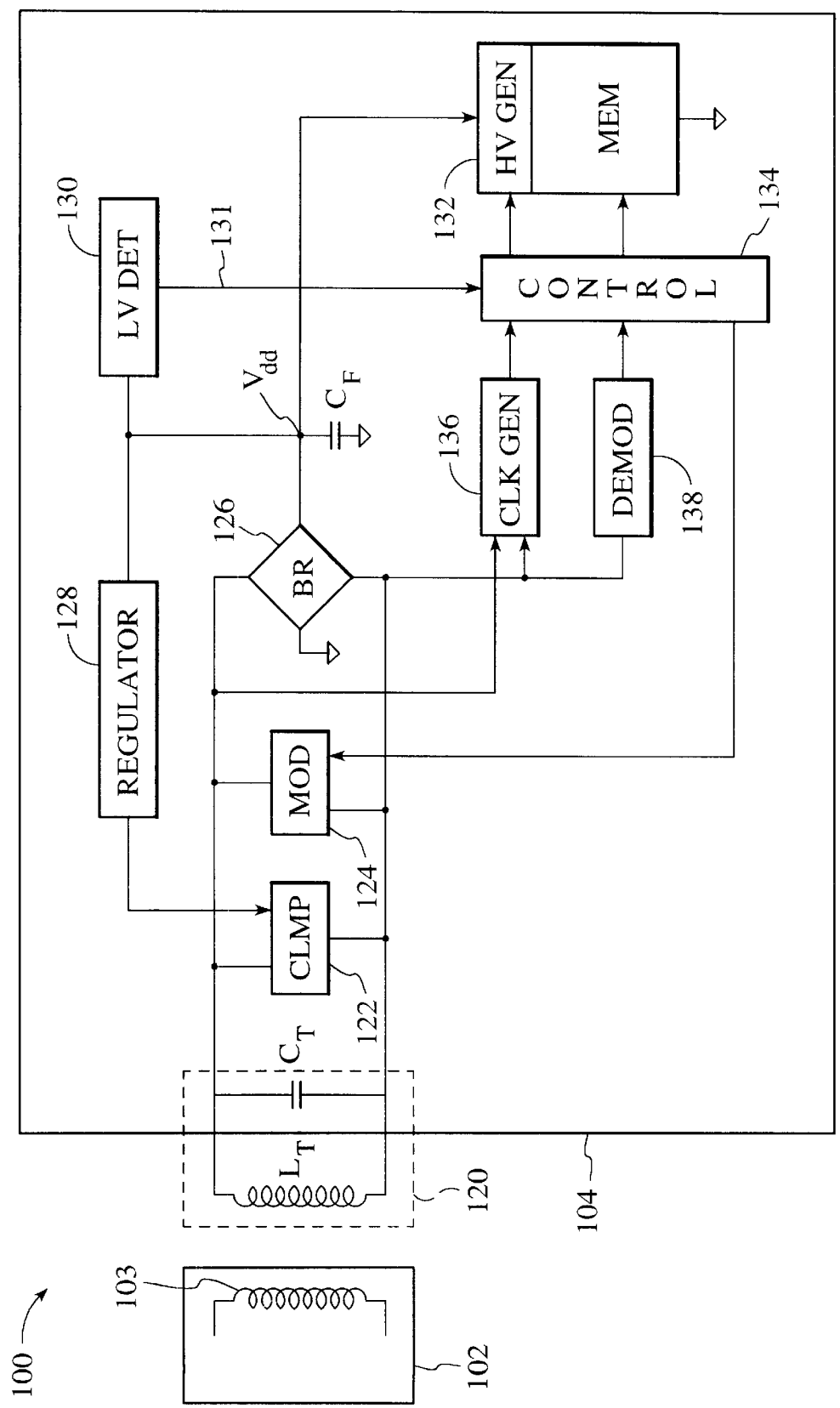
FIG. 1 shows a block diagram of the RFID tag in accordance with the present invention.

Referring to FIG. 1, a radio frequency identification (RFID) system 100 includes an interrogator unit 102 and a transducer unit (tag) 104. The interrogator 102 includes a transmit coil 103 for transmitting an RF signal to the tag 104.

The tag 104 comprises a pick-up coil $L_t$, which together with capacitor $C_t$, forms a tank circuit 120. Coupled across the tank circuit are a voltage clamp 122, a load modulation circuit 124, and a full-wave bridge rectifier 126. The voltage clamp 122 is an over-voltage protection device which limits the maximum voltage developed across the tank circuit 120. In such devices, the voltage across coil $L_t$ can increase to a level that is quite high, especially when the load is low and the Q of the tank circuit is high. Such a high voltage can cause failure of the device. When the voltage across the coil nears the safe limit of the device, the clamp 122 switches on to increase the current across the clamp and thus reduce the voltage.

The modulation circuit 124 varies a load placed across the tank circuit, which varies the Q factor of the tank circuit. The modulation circuit operates under the control of a controller 134 to vary the Q of the tank circuit in accordance with the data to be conveyed to the interrogator 102. The data is "transmitted" when the interrogator detects corresponding changes in the reflected signal.

The bridge rectifier 126 charges a small supply capacitor $C_f$ to provide the supply voltage $V_{dd}$. The supply voltage provides power to a nonvolatile memory 132, which includes a voltage pump to provide a programming voltage $V_{pp}$.

A clock generator 136 is coupled across the terminals of the coil $L_t$. The clock generator is essentially a differential comparator which extracts the clock from the signal received by the tag 104.

The memory 132 is a 256-bit EEPROM, consisting of eight 32-bit pages. Page 0 is organized as a 24 bit datum plus eight write-lock bits. Pages 1–7 are user pages. The write-lock bits determine whether the corresponding 32-bit page can be written. Password protection is available. The password is stored in user page 7. Read and write access to the memory 132 are provided through controller 134. A demodulator 138 demodulates an incoming data signal and feeds it into the controller 134. The data signal includes a sequence of command bits followed by an optional sequence of data bits.

Figure 2:
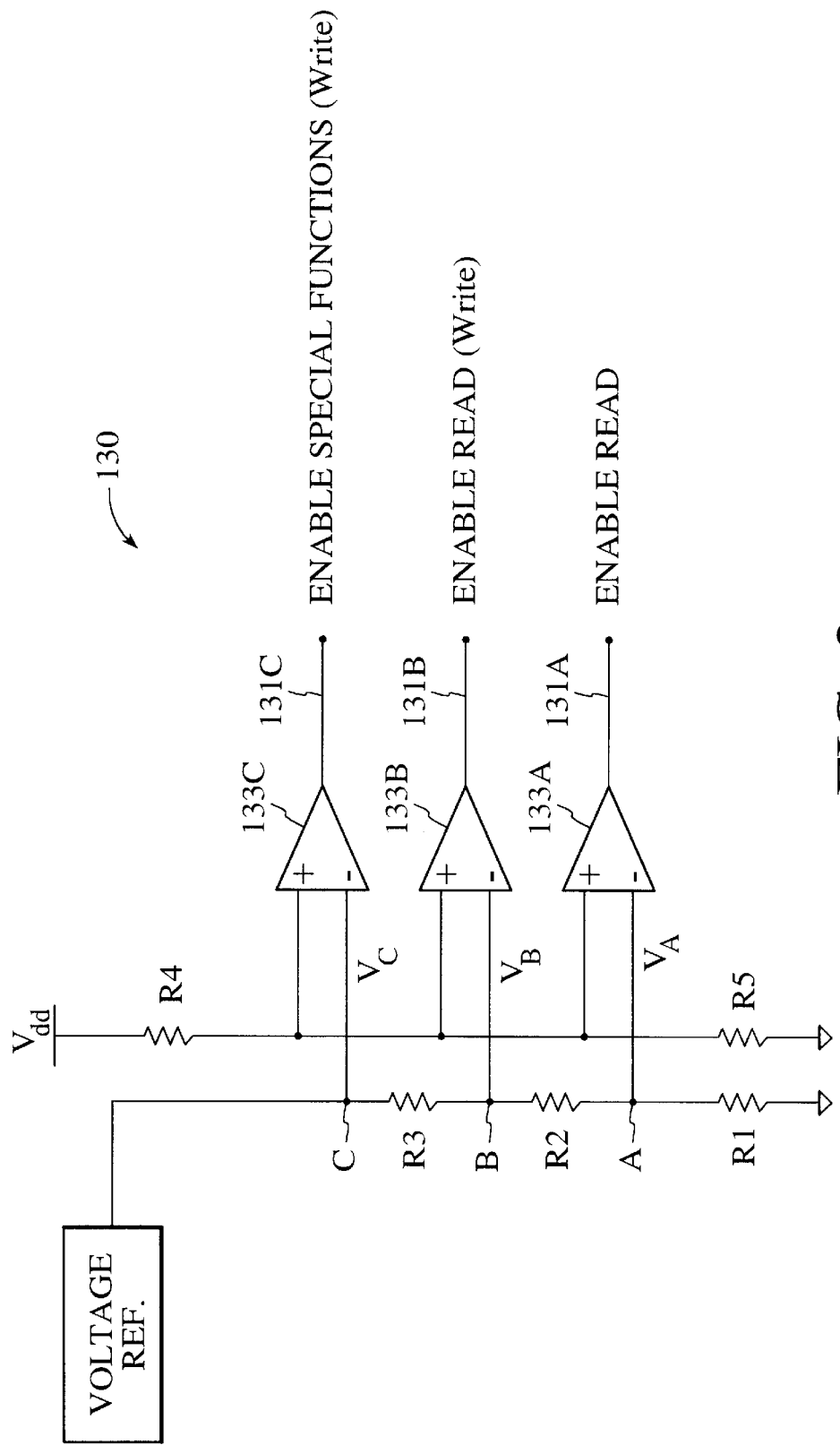
FIG. 2 is a block diagram of the low voltage detection circuitry of the present invention.

A low voltage detection circuit 130 provides enabling signals 131, enabling certain operations at various voltage levels as the device powers up. FIG. 2 shows a block diagram of the low voltage block 130 in accordance with the present invention. A voltage reference is dropped across a "resistor chain" consisting of resistors R1–R3. The schematic representation of FIG. 2 illustrates the circuit using resistors to clarify the explanation. However, it is understood that the "resistor chain" consists of a commonly used circuit comprising a series connection of N-channel transistors. The resistor chain serves as a multi-node voltage divider which feeds into a series of comparators 133A–133C.

The voltage reference circuit is set to the value of the bandgap voltage of a bipolar transistor, typically 1.2 V, and provides a voltage reference that is independent of the supply voltage, temperature, and process variations. Such circuits are well known and understood in the art, and any of a number of known designs can be used. A second resistor chain comprising R4 and R5 divides the supply voltage $V_{dd}$.

Each comparator compares the divided supply voltage against the voltage at each node A–C in the resistor chain. Thus, first enable signal 131A is provided when divided-down $V_{dd}$ reaches $V_A$, the voltage drop across resistor R1 which is computed by the following voltage divider equation:

$$V_A = V_{ref}\left(\frac{R_1}{R_1 + R_2 + R_3}\right) \qquad \text{Eq. 1}$$

Similarly, a second enable signal 131B is provided when divided-down $V_{dd}$ reaches $V_B$, defined by:

$$V_B = V_{ref}\left(\frac{R_1 + R_2}{R_1 + R_2 + R_3}\right) \qquad \text{Eq. 2}$$

Finally, a third enabling signal 131C originates based on the voltage at node C, which is simply the voltage reference itself. Thus, when the divided-down $V_{dd}$ reaches $V_{ref}$, signal 131C is asserted.

Returning to FIG. 1, the low voltage detector 130 feeds these enabling signals into the controller 134. Upon assertion of the first enabling signal 131A, the controller begins to read out the contents of memory 132 and to "transmit" the data by modulating the load of the tank circuit 120. The resistor R1 is selected so that the voltage drop $V_A$ across it is such that the transistors comprising the controller 134 just begin to switch. In this way read operations by the interrogator 102 can begin at the furthest possible distance from the transponder 104, thus effectively extending the operational range of the transponder.

The second enabling signal 131B of the low voltage detector 130 enables the controller 134 to permit write operations into non-secure areas of memory 132. This includes user pages 1–6 and, where password protection is not used, page 7 as well. Write access to page 0 (and page 7 if using password protection) are not permitted.

The third enabling signal 131C of the low voltage detector 130 enables the controller 134 to permit read and write operations into secure areas of memory 132. As mentioned above, page 0 includes write-lock bits which determine the write access of each of the corresponding eight 32-bit pages. Once a page is locked, it cannot be written to. Additional security is provided by preventing such a page ever to be unlocked. It is therefore critical to ensure that the writing of the lock bits be correct. This is accomplished by setting the voltage level corresponding to the third enabling signal to be that of the over-voltage protection circuit 122. By so doing, the voltage pump of memory 132 will be guaranteed to have available the maximum safe voltage to produce the highest possible programming voltage. This will facilitate a reliable write of the lock bits and thus minimize the chance of incorrectly locking out a page, which could render the device useless.

Recall that the reading of unsecured areas of memory begins as soon as the controller 134 begins to operate. Under such low voltage conditions, it is possible to misread memory and/or to experience an error in transmitting data to the interrogator, resulting in the reception by the interrogator of garbled data. In accordance with the present invention, data stored in memory 132 include error detection bits. The error bits are computed by the interrogator 102 and stored in the transponder 104 along with the data. Thus, corrupted data received by the interrogator can be detected by computing the error bits of the received data and comparing against the received error bits. Further, in accordance with the invention, the controller will continuously retransmit the data, so that even though a low voltage condition persists (due to the interrogator being at the extreme operating range), it is likely that a subsequent retransmission will result in correct data.

I claim:

1. A method of operating a radio frequency identification (RFID) tag having a tank circuit for receiving and transmitting signals, the RFID tag further having a memory, comprising:

transmitting a power signal to the RFID tag, thereby inducing a voltage in the tank circuit;

detecting a first power supply voltage level, the first power supply voltage level being one in which at least one transistor in the RFID tag just begins to switch;

in response to detection of the first power supply voltage level, modulating a Q factor of the tank circuit in a manner which represents data stored in the RFID tag to effectively transmit the data;

detecting a second power supply voltage level greater than the first power supply voltage level; and in response to detection of the second power supply voltage level, enabling write operations to a first portion of the memory.

2. The method of claim 1 further including producing the power supply voltage by rectifying the power signal and charging a capacitor.

3. The method of claim 1 further including receiving data for storage in the memory, the data including error detection bits.

4. The method of claim 1 further includes repeating the step of modulating the Q factor to effectively retransmit the data.

5. The method of claim 1 further including detecting a third power supply voltage level and enabling reading and writing of a second portion of the memory.

6. The method of claim 5 further including enabling reading and writing of a password stored in the RFID tag upon detecting the third power supply voltage level.

7. The method of claim 6 further including enabling reading and writing write-lock bits upon detecting the third power supply voltage level.

8. A method of operating a radio frequency identification (RFID) tag, the method comprising:

receiving a power signal on a radio frequency carrier transmitted to the RFID tag;

producing a supply voltage from the received power signal;

detecting when the supply voltage reaches a first voltage level, the first voltage level being one in which at least one transistor in the RFID tag just begins to switch;

enabling a first memory-read operation in response to detection of the first voltage level;

transmitting the data read;

detecting when the supply voltage reaches a second voltage level greater than the first voltage level and enabling a memory-write operation in response thereto; and detecting when the supply voltage reaches a third voltage level greater than the second voltage level and in response thereto enabling a second memory-read operation to read a password stored in the RFID tag.

9. The method of claim 8 further including enabling a memory-write operation in response to detection of the third voltage level to write to the password.

10. The method of claim 8 wherein the step of transmitting includes modulating a load resistor of a tank circuit.

11. The method of claim 10 further including repeating the step of modulating the load resistor to retransmit the data read.

12. The method of claim 11 wherein the step of producing a supply voltage includes rectifying the received power signal and charging a capacitor.

13. The method of claim 8 further including providing a protected memory area and an unprotected memory area and storing the password in the protected memory area, wherein the first memory-read operation is directed to the unprotected memory area and the second memory-read operation is directed to the protected memory area.

14. The method of claim 13 further including enabling a memory-write operation directed to the protected memory area in response to detection of the third voltage level, and storing write-lock bits in the protected memory area.

15. A radio frequency identification (RFID) tag comprising:

first enabling means for providing a first enable signal;

second enabling means for providing a second enable signal;

a tank circuit including a load;

means for modulating the load to vary the Q factor of the tank circuit; and a memory array having means for reading data contained therein and means for writing data thereinto;

the means for reading being coupled to the means for modulating to vary the Q factor of the tank circuit in response to data read from the memory array;

the means for reading being coupled to and enabled by the first enabling means;

the means for writing being coupled to and enabled by the second enabling means.

16. The RFID tag of claim 15 further including means for producing a supply voltage; the first enable signal indicating that a supply voltage has reached a first voltage level; the second enable signal indicating that the supply voltage has reached a second voltage level greater than the first voltage level.

17. The RFID tag of claim 16 further including an input over-voltage protection device, the protection device being triggered when the RFID tag reaches the second voltage level, the protection device coupled to enable the means for writing.

18. The RFID tag of claim 15 further including a third enabling means for providing a third enable signal, and second means for reading and writing the memory device being enabled by the third enabling means.

19. The RFID tag of claim 18 further including a password, wherein the second means for reading and writing is coupled to read and write the password.

20. The RFID tag of claim 19 further including write-lock bits, wherein the second means for reading and writing is coupled to read and write the write-lock bits.

* * * * *